United States Patent [19]

Bauer et al.

[11] Patent Number: 4,707,694

[45] Date of Patent: Nov. 17, 1987

[54] TELEPHONE SYSTEM PORT COMMUNICATION METHOD AND APPARATUS

[75] Inventors: David L. Bauer, Thornton; Larry D. Bowyer, Boulder; David M. Ruby, Aurora; Richard A. Windhausen, Thornton, all of Colo.

[73] Assignees: American Telephone and Telegraph Company, New York, N.Y.; AT&T Information Systems Inc., Morristown, N.J.

[21] Appl. No.: 873,139

[22] Filed: Jun. 6, 1986

Related U.S. Application Data

[63] Continuation of Ser. No. 585,833, Mar. 2, 1984, abandoned.

[51] Int. Cl.$^4$ ............................................. H04Q 1/00
[52] U.S. Cl. ........................... 340/825.52; 340/825.08; 340/825.54
[58] Field of Search .................. 370/80, 85, 86, 90, 370/93, 94, 96, 58, 61; 340/825.08, 825.52, 825.54; 364/200; 179/2 TS, 2 DP

[56] References Cited

U.S. PATENT DOCUMENTS

| | | | |
|---|---|---|---|
| 3,702,008 | 10/1972 | Groth | 370/96 |
| 4,010,452 | 3/1977 | Cazanove | 364/200 |
| 4,149,144 | 4/1979 | Diefenderfer | 370/96 |
| 4,173,754 | 11/1979 | Feiker | 340/310 A |
| 4,306,287 | 12/1981 | Huang | 364/200 |
| 4,539,676 | 9/1985 | Lucas | 370/94 |
| 4,546,468 | 10/1985 | Christmas et al. | 370/58 |

OTHER PUBLICATIONS

"Minicomputer Systems Structure, Implementation, and Application" Cay Weitzman, pp. 66-70.

*Primary Examiner*—Ulysses Weldon
*Attorney, Agent, or Firm*—John A. Caccuro

[57] ABSTRACT

There is disclosed a port communication method and apparatus for controlling system controller communications with port circuits of the system. The port communication apparatus generates commands to port module interfaces, interposed between the controller and port circuits, in a predetermined order and receives acknowledgement signals therefrom. Thereafter, the port interfaces concurrently collect data from the associated port circuits and transmit this data in response to a subsequent read command from the port communication apparatus. In one embodiment the port communication apparatus includes a programmable microcode routine which generates the commands using input parameters which are specified in various registers and in the microcode program call.

22 Claims, 6 Drawing Figures

TELEPHONE SYSTEM PORT COMMUNICATION METHOD AND APPARATUS

This application is a continuation of application Ser. No. 585,833 filed Mar. 2, 1984, now abandoned.

FIELD OF THE INVENTION

This invention relates to telephone communication systems and, more particularly, to a telephone system apparatus and method for controlling repetitive port communications.

BACKGROUND OF THE INVENTION

In telephone communication systems including a port module for controlling a plurality of port circuits for interfacing various terminal equipment, it is often necessary for the system processor to send communications or commands to each of these port modules to retrieve status or other information associated with the ports and/or terminals. In the prior art when a system includes multiple port modules, system controller commands are sequentially transmitted to and expect a response in real-time from these port modules. Disadvantageously, however, when a port module was not ready to respond or had a failure the system controller would have to wait for the response or time out, respectively. These delays resulted in a degradation of the real-time performance of the system.

SUMMARY OF THE INVENTION

The foregoing problems are overcome in a telephone communication system using the present port communication method and apparatus which generates system controller commands which are sent to the port modules and processed in parallel thereat. In particular, the present invention enables separate controller commands to be sent in a rapid ordered sequence to a preselected number of port module interface circuits which interface each module's port circuits to the system controller. In response to the command, each preselected port interface circuit immediately responds to the system controller with a command received acknowledgement signal. Each preselected port interface circuit collects data from its associated port circuits and prepares a response for the system controller. The responses from the preselected port interface circuits are essentially being generated in parallel. Thereafter, the system controller reads these responses from the port interface circuits which forwards the preselected port data received from its port circuits.

In one embodiment, the port communication apparatus includes a programmable microcode command sequencer in the system controller which generates the controller commands using various registers and tables which specify the first and last port module to be accessed, whether those port modules are on-line, where the port modules' responses should be stored and comparison data against which port module responses should be compared.

BRIEF DESCRIPTION OF THE DRAWINGS

The operation of the present invention will be more fully appreciated from the detailed description which references the drawings in which.

DETAILED DESCRIPTION

Figure 1:
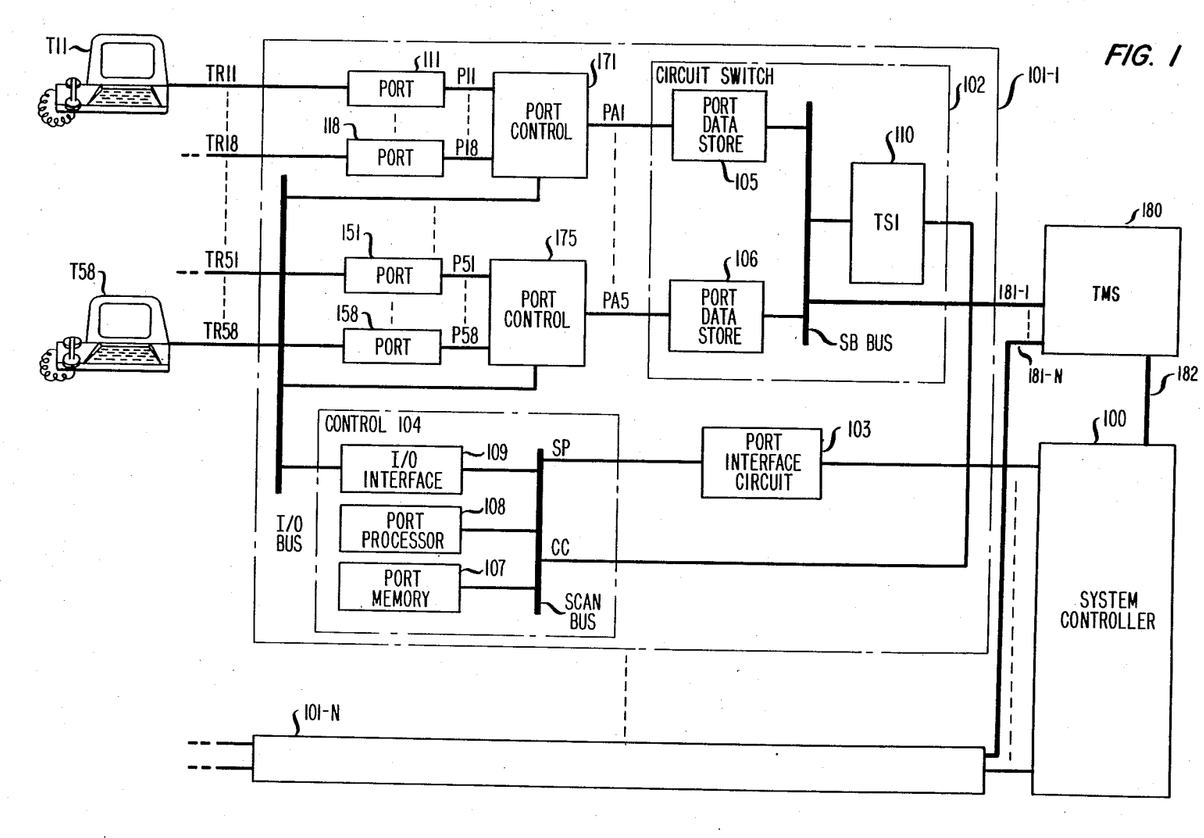
FIG. 1 shows a block diagram of a telephone communication system incorporating the present invention.

An illustrative telephone switching system for incorporating the present invention is illustrated in FIG. 1. The system includes a system controller and a plurality of port modules 101-1 through 101-N. Each port module includes a plurality of terminal equipment T11-T58 each of which is associated via communication paths TR11-TR58 with a respective one of port circuits 111-158. This terminal equipment may include telephone station sets as well as digital terminal devices. A circuit switch 102, which comprises a time slot interchange circuit 110 of the type illustrated in U.S. Pat. No. 4,112,258, may be used together with port data stores 105 and 106 to interconnect a number of port control circuits 171-175, each of which serves a plurality of port circuits 111-158 and their associated data terminals and/or telephone station sets (T11-T58). Circuit switch 102 establishes communications connections among port circuits 111-158 using time slot interchanger (TSI) 110.

Each port control circuit (e.g., 171) shown in FIG. 1 serves a plurality of port circuits (111-118) and functions to interface these port circuits with circuit switch 102 as well as the system processor 100 via I/O interface 109, port processor 108 and port interface circuit 103.

In this system, a control module 104 comprising port processor 108, I/O interface 109, and port processor memory 107 performs many of the hardware-oriented and real-time intensive control tasks such as port scanning and other port supervision functions. This control module 104 thereby deloads system controller 100 and also functions to insulate system controller 100 from the hardware details of the terminal/station circuits served by the system. Port interface circuit 103 converts the protocol, data rate, word format and word size to enable compatible communications between port processor 108 and system controller 100.

The system of FIG. 1 also includes a time multiplexed switch (TMS) 180 which is connected to modules 101-1 through 101-N by paths 181-1 through 181-N, respectively. The TMS 180 is used in the serving of intermodule calls and is controlled in its operation by system controller 100 via path 182. The TMS is connected by paths 181- to the SB bus associated with the TSI in each module. It functions on intermodule calls by effectively interconnecting the SB bus in the two modules involved on a call with each other so that PCM data can be exchanged between modules.

While the operation of the present invention will be described in terms of the system shown in FIG. 1, it should be borne in mind that the present invention can be used in any number of similar type systems. Hence, only system information relevant to the understanding of the present invention will be included in this detailed description. Moreover, since the present invention and features thereof are most readily implemented in a stored program controlled system it must be blended into the overall program structure of the system. Thus, in describing the present invention only those interactions with the system program structure which are required for an understanding of the present invention will be included in the description that follows. In order to avoid confusion and in order to allow those skilled in the art to utilize the invention claimed herein this patent specification will concentrate on providing an understanding of the logical steps necessary for implementing the present invention.

System Operation

The following provides a general background description of the operation of the telephone system shown in FIG. 1. The message format used for communications between the various system components is illustrated in copending patent application Ser. No. 417,504 filed by J. A. Lucas on Sept. 13, 1982, now U.S. Pat. No. 4,539,676.

Port processor 108 controls the scanning of port circuits 111-158 as well as the operation of circuit switch 102. In particular, port processor 108 generates a scan frame rate such that each port trunk and service circuit connected to circuit switch 102 is scanned once during each network scan cycle. Port processor 108 accomplishes this by transmitting timing, address and control information to I/O interface 109 via SCAN BUS. I/O interface 109 then transmits these signals via I/O BUS to port control circuits 171-175.

Each port control circuit (e.g., 171) interprets the signals received on I/O BUS during each scan frame and determines whether the address signals transmitted thereon identify one of the port circuits (e.g., 111) served by that port control circuit (171). If such a match occurs during a scan frame, port control circuit 171 enables the identified port circuit 111 during the first half of the scan frame which, in turn, reads the data (via leads P11) being transmitted to port control circuit 171 by port processor 108. Port circuit 111 is responsive to this control data for controlling the operation of the associated terminal equipment T11. This is accomplished by port circuit 111 transmitting control segments which indicate the desired operation to terminal equipment T11.

Terminal equipment T11 responds to these control segments by performing the indicated operation, such as lighting a lamp, producing an audible ring signal, etc. During the second half of the scan cycle, port circuit 111 transmits control data, which has been received from terminal equipment T11 as a control message to port processor 108. These control data transmissions from port circuit 111 are received by port circuit 171 and forwarded via I/O BUS to I/O interface 109, which, in turn, transmits the control data to port processor 108 via SCAN BUS. In this fashion, control data are exchanged between terminal equipment T11-T58 and port processor 108.

Port processor 108 collects this control data and creates a control message (containing this control data) which is stored in a first-in-first-out (FIFO) register. This port processor control message or response is transmitted via SCAN BUS to port interface circuit 103 in response to a read FIFO command therefrom. As will be described more completely in a later paragraph, system controller 100 sends an unload FIFO command to port interface circuit 103 requesting information about port circuits in module 101-1. The transmission from port processor 108 is in response to this unload FIFO command received from system controller 100 after being reformatted by port interface circuit 103. Thus, the control data generated by the terminal and port circuits is collected by port processor 108, which then transmits the data to port interface circuit 103 in response to a command originating from system controller 100.

Figure 2:
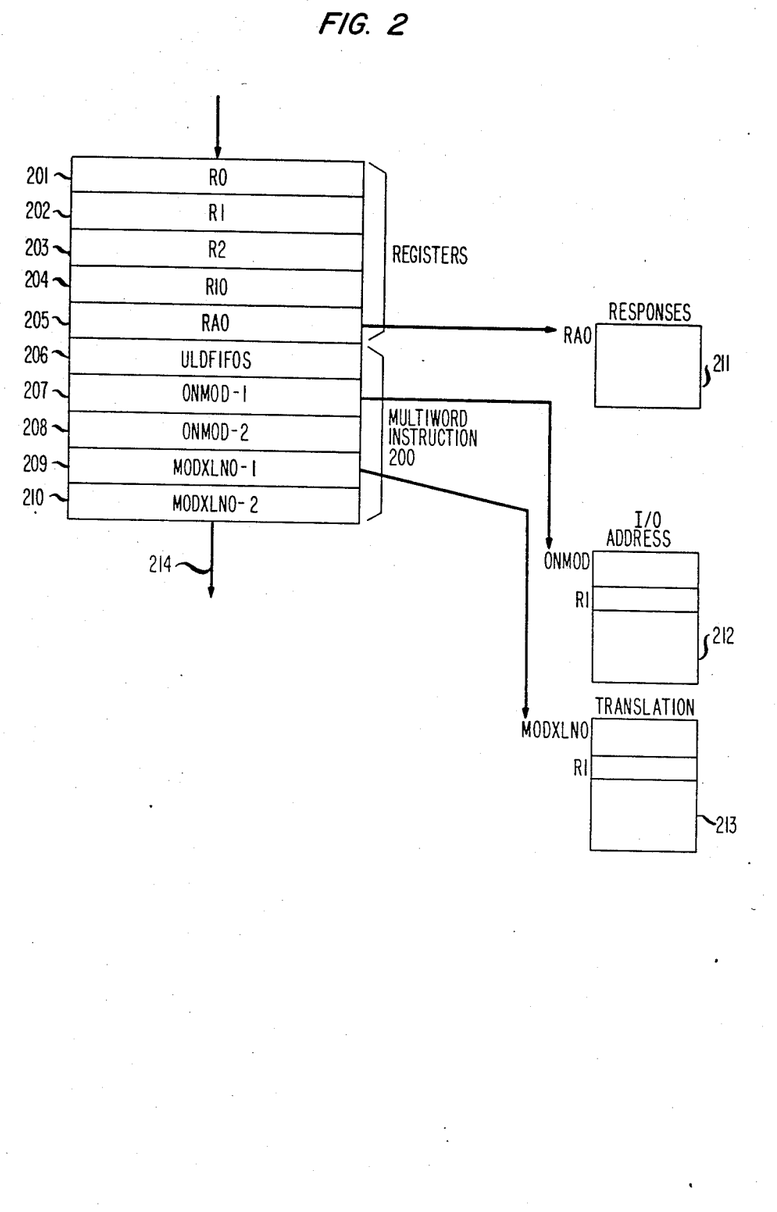
FIG. 2 shows an embodiment of the multiple word instruction for enabling the programmable microcode sequencer embodiment of the present invention.

The following description of one embodiment of the present invention for controlling the communications between port processor 108, port interface circuit 103 and system controller 100 makes joint reference to FIGS. 1-5. Shown in FIG. 2 is the sequence of program instructions which initiate the operation of the present invention. System controller 100 performs its various operating functions under program control until instruction 201 is reached. Instructions 201-205 load, respectively, the registers R0, R1, R2, R10 and RA0 of system controller 100 with the various input or entry parameters which are required by the present invention.

Register R0 contains comparison data or a code against which responses from port processors (e.g., 108) are compared to determine the operating status of each port processor and its associated port circuits. Since a response received from the port processors is the contents of its FIFO, the comparison code may be an empty FIFO code, an error code for an ill-formed command or a code defining the expected response.

Register R1 contains the number of the first port processor or module to be sent a command or message. Register R2 contains the number of the last port processor or module to be sent the command or message. Thus, registers R1 and R2 are used to select the group of port processors or modules which are to be sent a command. Register R10 is the register which stores an UNLDFIFO (unload FIFO) command or other command or message desired to be sent to the port processor. Address register RA0 contains the starting address of the table 211 where the responses from the port processors, beginning with the first port processor specified in register R1, are to be stored.

Multiword instruction, 206-210, is a program call which system controller 100 decodes resulting in the enabling of the operation of the programmable microcode sequencer routine shown in FIGS. 3 through 6. The first word 206 of the multiword instruction contains a unique operation code that causes an invocation of the microcode routine shown in FIGS. 3 through 6. Words two and three, 207 and 208, of the multiword instruction constitute the address of the table ONMOD, 212, which stores the I/O address of all on-line port processors. Adding the contents of register R1 to this address ONMOD gives the address of the word in table 212 containing the I/O address of the first port processor to which the command in register R10 is to be sent. In words four and five, 209 and 210, of the multiword instruction is the address of the port processor translation table MODXLNO, 213. Table 213 is used to indicate various information about the port modules. Adding the contents of register R1 to the address MODXLNO gives the translation information for the first port processor to receive the command. The translation information indicates to the microcode routine information about each port processor including whether it is equipped in this system, what options are present, etc.

At the conclusion of the operation of the multiword instruction the following outputs are returned to the main program of the system controller. A summary bit, or condition flag (CF), equal to one is returned if all modules responded successfully and returned the code initially specified in register R0. A CF equal to zero is returned if the command execution failed (due to parity error or timeout) for one or more modules, or if one or more responses were not the response initially specified in register R0. Register R0 will be loaded on exit from the multiword instruction as follows:

R0=0 if all modules returned the code in R0 and if no error conditions were sensed.

R0=1 if at least one module returned data other than the code in R0, but no error conditions were sensed.

R0=2 if all modules which returned data returned the code in R0 but an error condition was sensed on at least one module.

R0=3 if at least one module returned data other than the code in R0, and an error condition was sensed on at least one module.

R0=4 if the entry parameters are invalid (i.e., the module identified in register R2 is less than the module identified in register R1).

Note, these same criteria are applied for commands other than UNLDFIFO which are processed by the multiword instruction microcode routine. All other registers will be returned unchanged.

The various memory locations of table RA0 are loaded with the result obtained from executing the multiword instruction routine. In the following description, the abbreviation <R1> refers to the contents of register R1, i.e., the port processor or module number identified therein, while <R1>+1 refers to the next port processor or module after <R1>. The abbreviation [<RA0>+x] refers to the contents of the memory word whose address is calculated by adding the constant x to the contents of address register RA0.

Thus, the contents of the various locations of table RA0 which contain the responses from the modules, can be described as follows:

```
[<RA0>]    = response to command from module
             identified in register R1 (<R1>) if
             contents of location RA0 + 1 equals zero.
[<RA0>]    = unchanged if contents of location
             RA0 + 1 do not equal zero.
[<RA0 + 1>] = 0 if command for module identified
             in register R1 is successful
[<RA0 + 1>] = 1 if write I/O failure for module <R1>
[<RA0 + 1>] = 2 if read I/O parity failure for
             module <R1>
[<RA0 + 1>] = 3 if read I/O timeout failure for
             module <R1>
[<RA0> + 2] = similar to [<RA0>] for module
             <R1> + 1
[<RA0> + 3] = similar to [<RA0> + 1] for module
             <R1> + 1
    .               .
    .               .
    .               .
```

The operation of the programmable microcode sequencer routine is illustrated in FIGS. 3 through 6. Implementing the operation of the multiword instruction in a microcode routine considerably enhances the speed of operation of the present invention over what may be achieved by implementing the routine in a sequence of standard program instructions used in system controller 100. Background information on the well known operation of microcode or microprogramming is described in pps. 65-70 of the book entitled "Minicomputer Systems—Structure, Implementation, and Application" by Cay Weitzman, published by Prentice-Hall, Inc., 1974.

Figure 3:
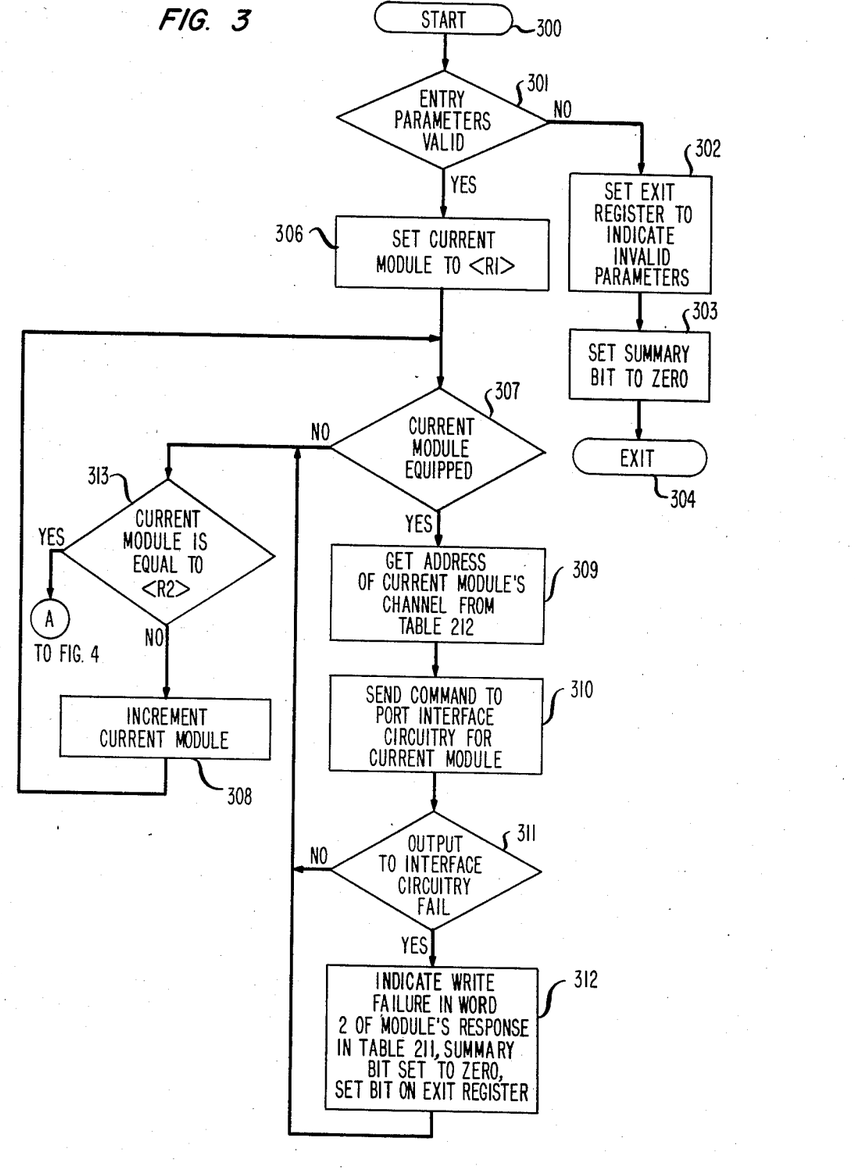
FIGS. 3 through 6 show the flow charts which describe the operation of the present invention.

System controller 100 decodes the operation code, 206, of the multiword instruction and calls the microcode routine shown in FIGS. 3 through 6. In the following description, when reference designation is shown, the first digit of that designation indicates the figure on which that designation appears. With reference to FIG. 3, the microcode routine starts in step 300. The basic operation of this routine is to communicate with port processors in all port modules 101-1 through 101-n in parallel, thus overlapping the delays which occur when communication with these port processors is performed serially.

At the start, 300, the input or entry parameters for the microcode routine are provided. These parameters include the comparison data (in register R0) for the response for each module, the first port processor or module to be scanned (in register R1), the final port processor or module to be scanned (in register R2), the command to be sent to each port processor or module (in register R10), the address in memory where responses are to be stored (in address register RA0), the address ONMOD of a table of the input/output addresses for the currently on-line port processor in each module, and the address MODXLNO of port processor translation data used by the microcode routine to determine which modules or port processors are actually equipped.

In decision step 301, these entry parameters are checked. For example, the lowest module (<R1>) to be scanned is checked to verify that it is less than or equal to the highest module (<R2>). If entry parameters are found to be invalid, control passes to step 302, where the exit register R0 is set to a code indicating invalid input parameters, then to step 303, where the summary exit bit (the condition flag, CF) is set to zero indicating an error, and then the multiword instruction routine terminates and exits 304. Control is then returned to the next instruction 214 in the system controller program.

If, however, entry parameters are found to be valid in decision step 301, control then passes to step 306. In this step, the microcode routine's internal reference to the module currently being addressed is set to the first module specified by the contents, <R1>, of register R1.

Control then passes to decision step 307, where the currently referenced module number is checked to see if it is equipped. This is accomplished by checking bits found in the table of module translation data, 212, at the address MODXLNO+<R1>. The address MODXLNO is obtained from words four and five of the multiword instruction 200. If the module is not equipped, control passes to step 313, described later.

If, as is the normal case, the module is found to be equipped, control passes to step 309. Here, the microcode routine retrieves the input/output address of the current module from the table of addresses, 212, located at the address supplied in words two and three of the multiword instruction 200. Control then passes to step 310, where the command specified in register R10 (e.g., unload FIFO, "UNLDFIFO") is sent to the port interface circuit 103 of the module whose address was found in address table 212 in step 309.

Control then proceeds to decision step 311, where it is determined if the output to the port interface circuitry was successful. In the case of failure, control passes to step 312, where the second word of the module's response in table 211 and register R0 are set to indicate a write failure and the condition flag CF is set to zero. Recall from the prior description that the response for the first module is stored at location specified by <RA0>. The table for module responses received by the microcode routine is organized as a set of two-word pairs. The first word of each pair is used to hold the response from the module when the command execution for that module is successful (see 501 of FIG. 5). The second word of each pair is used to hold a success/failure indication for that module. Here, in step 312, one of the failure conditions, a write failure to module <R1>, is recorded in word 2.

After the failure has been recorded in step 312, or after successful command output as determined by decision step 311, or after a module is found to be unequipped in decision step 307, control passes to decision step 313, where the current module number is compared to the highest module to be scanned (the contents in register R2, i.e., <R2>). If the current module number is not equal to this high scan module, control passes to step 308, where the internal reference to the current module number is incremented. Control then passes to decision step 307, and the sequence of events described above is repeated for the new module number. If, however, the current module number is found to equal the high scan module (<R2>) in decision step 313, control is transferred to step 401.

Thus, in a rapid manner the multiword instruction microcode has distributed a system controller 100 command contained in register R10, e.g., UNLDFIFO, to the port interface circuits of selected modules (101-1 through 101-$n$), as defined by translation table 213, and has received responses indicating whether these port interface circuits have correctly received the commands. Any error responses have been stored in response table 211 for analysis by the appropriate programs (not described herein) of system controller 100. In response to the system controller command contained in register R10, each port interface circuit of a commanded module almost concurrently commands, in parallel, its associated port processor for a response. The port processor responds with the control data it has collected from scanning its terminals T11-T18 and port circuits 111-158, or other data as defined for the various commands that can be specified in register R10. Consequently, the delay encountered by system controller 100 in waiting for a response from all modules is essentially equal to the delay for one module. Thus, the operational time required by the system controller 100 in performing these type of functions is not significantly increased when the number of port modules controlled by the system increases.

Figure 4:
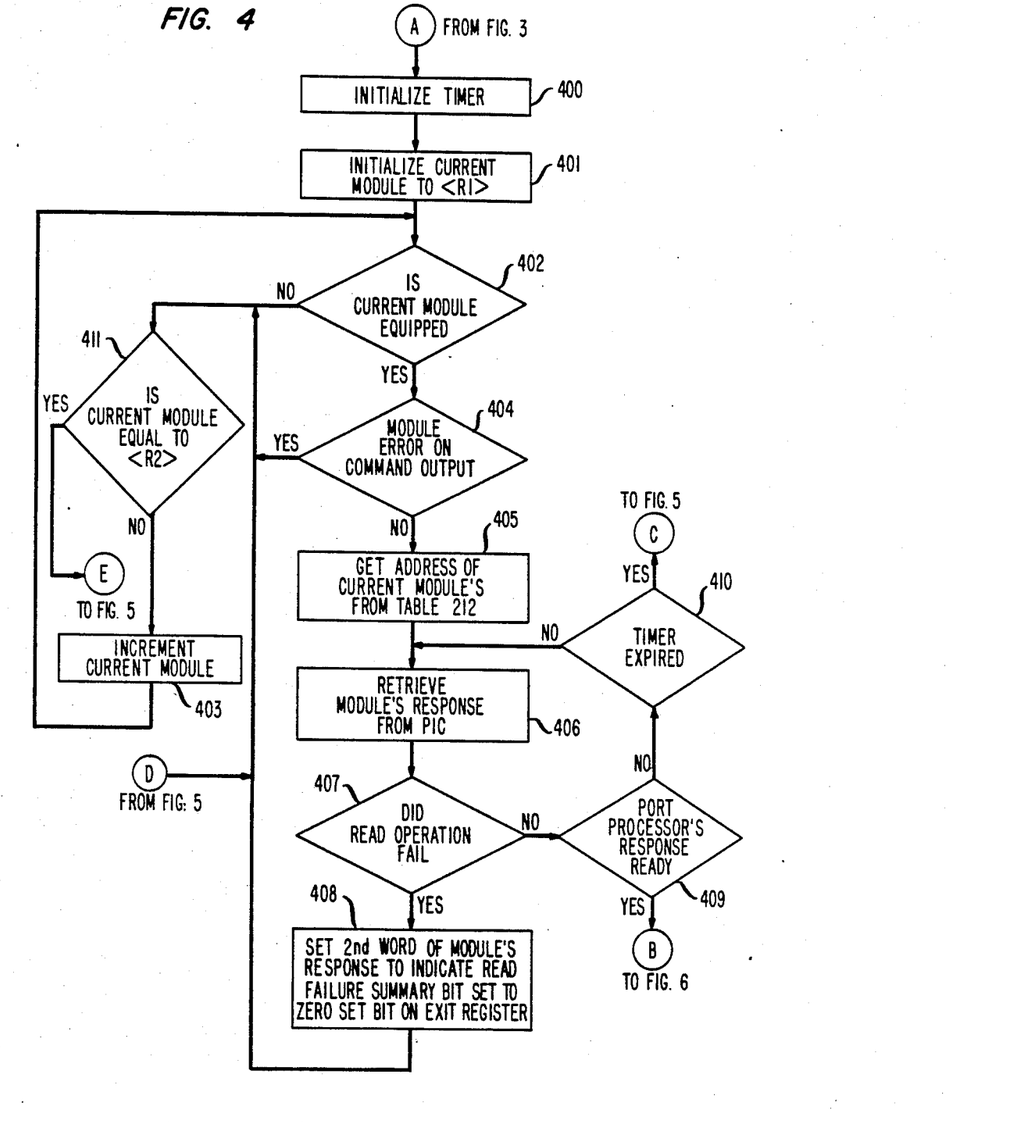

Steps 400 through 411 of the microcode routine are designed to retrieve the responses to the commands that were sent to the various modules in steps 300 through 313. In step 400, an execution timer is initialized. The timer sets the maximum time that the multiword instruction is allowed to execute. Should this time be exceeded, the microcode routine terminates (see 410). After the timer is initialized, control passes to step 401, where the internal reference to the current module number is reset to the low module number supplied in register R1. Control passes to decision step 402, where it is determined if the current module is equipped. If the module is found not equipped, control transfers to decision step 411, described at the end of this section.

If the module is found to be equipped in decision step 402, control transfers to decision step 404. There, the results of the command output performed previous by step 310 are reviewed. That is, did the current module experience an error on command output? If the output had failed, control is transferred to decision step 411, described at the end of this section. If, as is the usual case, the output did not fail, control is transferred to step 405.

In step 405, the input/output address of the current module is retrieved from the table of addresses, 212, in a manner identical to that performed by step 309. Control passes to step 406, where the response to the command is attempted to be retrieved from the port interface circuit PIC (103 of FIG. 1) of the current module. Control then flows to decision step 407, where the success or failure of the read operation in step 406 is determined. If the read operation failed, then in step 408 the second word of the two-word memory pair for this module's response and exit register R0 are set to indicate a read failure and the condition flag CF is set to zero, in a manner similar to that described for step 312 above. Control then transfers to decision step 411, described at the end of this section.

If, however, the read operation in decision step 407 did not fail, control passes to decision step 409. In this case, one of two conditions has occurred. Either the actual response from the port processor (e.g., 108 of FIG. 1) was retrieved, or a condition was sensed where the read operation itself was successful, but the actual response was not yet available from the port processor. If it is the case that the response was not ready, control transfers to decision step 410, described in the following paragraph. If, however, the actual response was retrieved by this read operation, as determined in decision step 409, control is transferred to step 601 of FIG. 6, described later.

If the response was not ready, then at decision step 410, there exists a condition where the read operation was successful, but the actual response was not yet available. The execution timer, originally initialized by step 400, is tested to see if it has expired. If it has not, control is transferred back to step 406, where an additional read operation on the same module is performed. The loop of steps 406, 407, 409 and 410 continue until a response is received or until the timer in step 410 expires. If the timer expires, control transfers to step 501 of FIG. 5.

Figure 5:
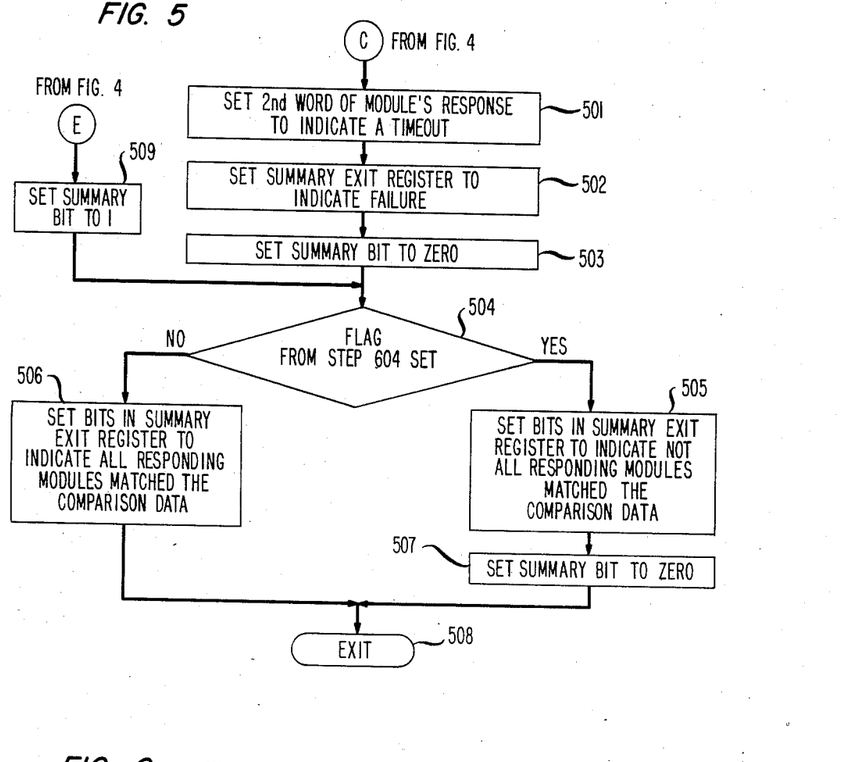

With reference to FIG. 5, in step 501, the second word of the two-word memory pair for this module's response is set to indicate a timeout failure in a manner similar to that employed by steps 312 and 408. Control transfers to step 502, where a bit in the summary register R0 is set to one, indicating timeout failure. Control passes then to step 503, where the summary bit, or condition flag CF, is set to zero, indicating failure. Control next passes to decision step 504, where it is determined if the error flag described below for step 604 has been set during this invocation of the microcode routine. If this error flag has been set, control passes to step 505. If it has not been set, control passes to step 506.

In step 506, an additional bit in the summary exit register (R0 of FIG. 2) is set to zero to indicate that all modules responded with data which matched the comparison data (supplied as an input parameter in register R0 of FIG. 2). In step 505, this same bit is set to one to indicate that at least one module did not respond with this comparison data. After step 505, step 507 sets the summary bit (condition flag CF) to zero (in case it had been set to one by step 509) to indicate that at least one module did not respond with the comparison data. After steps 505 and 507 or 506, control flows to step 508, where the multiword instruction microcode exits and control is returned to the main program of system controller 100 at instruction 214.

Figure 6:
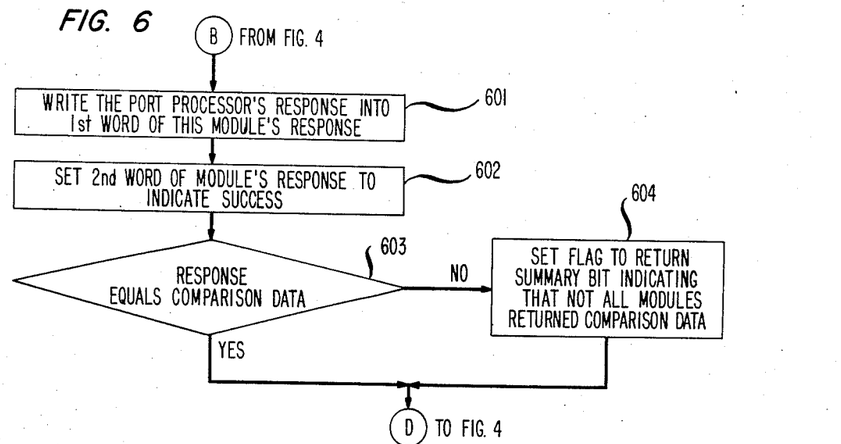

With reference to FIG. 6 we now describe the operations that are performed if the actual response from the port processor was found to be available in decision step 409 of FIG. 4, described above. Control passes to step 601, where the response from the port processor is stored in the first word of the two-word memory pair for this module in response table 211. Control passes to step 602, where the second word of this pair is loaded with a code indicating successful retrieval of the response from the port processor of this module, using an operation similar to that described above for steps 312, 408 and 501. Control then passes to decision step 603.

In decision step 603, the port processor response stored by step 601 is compared to the comparison data supplied as input in register R0. If the response is not the same as this comparison data, an internal flag is set by step 604 to indicate that the summary exit register R0 and condition flag should be set by step 505, described above. After step 604 is executed, or if it is found in step 603 that the response is the same as the comparison data, control transfers to step 411 of FIG. 4.

Returning to FIG. 4, as noted step 411 is reached from steps 603 or 604, as well as from decision step 402 when the current module is found not equipped, or from decision step 404 when it is found that the current module experienced an error on command output, or from step 408 when a read operation for the current module fails. In step 411, where the current module number is compared to the highest module to be scanned, as supplied in register R2. This operation is similar to that performed in decision step 313. If it is found in decision step 411 that the highest module number has not been reached, control is passed to step 403 where internal reference to the current module is incremented in a manner similar to step 308 described above. Control then passes to decision step 402 described above, where the response retrieval (read) process is carried out for this next module.

If, however, it is determined in step 411 that the highest module number has been reached, then it is time to prepare to exit the microcode routine. In this case, with reference to FIG. 5, control transfers to step 509, where the summary bit, or condition flag CF, is set to one to indicate a successful execution of the multiword instruction. This bit will be reset to zero by step 507 if it has been determined by step 504 that one of the modules did not return the desired comparison data. The function of this summary bit is to report that all modules executed successfully and that all modules returned the desired comparison data. Thus, from step 509 control is transferred to decision step 504, as described above, so that this determination can be made. After the summary bit CF and exit register have been loaded in step 507 or step 506, the microcode routine exits, returning to the main program of system controller 100 at instruction word 214. There, the main program of system controller 100 can check the contents of register R0 and the condition flag CF to determine a summary of the results of the command transmission and the response retrieval by the microcode routine described in FIGS. 3 through 6. As previously described, the actual response from each module is available in that module's designated location in response table 211. When the main program again desires to command the port processors of selected modules it again loads the input parameters into registers R0, R1, R2, R10, RA0, provides the five words of the multiword instruction and passes control to the multiword instruction microcode to retrieve the information.

It should be obvious that the number and format of the various instruction words, register contents, table content, commands, responses, etc. can be changed to suit the particular application without deviating from the concept of the present invention. Thus, for example, the command sent to the port interface circuits could be any one-word or multiple word command which the system controller wants to distribute via the port interface circuits to the port circuits. Additionally, the routine shown in FIGS. 3 through 6 and tables 212 and 213 can be changed to enable multiple commands to the same module, different commands to different modules, different frequency of transmissions to each module and where multiple port interface circuits exist at a module, commanding all of them or selectively commanding a subset thereof. Obviously, in a system having a multiple command capability, the resulting interface responses can be compared against the associated comparison data which is stored in register R0. Moreover, other variables such as timeout values, etc. could similarly be adapted to the characteristic of the particular application. Finally, the port processors, port interface circuits and multiword instruction routine could be implemented in hardware or program controlled devices without deviating from the scope of the present invention.

Thus, what has been disclosed is merely illustrative of the present invention. Other arrangements and methods can be implemented by those skilled in the art without departing from the spirit and scope of the present invention.

What is claimed is:

1. A communication system for serving a plurality of communication devices each of which is connected to an associated port circuit, said system including a system controller for transmitting commands to control said port circuits and for receiving data transmitted from said port circuits, said system further comprising
    a plurality of port interfaces each interposed between said system controller and one of said port circuits wherein each port interface sends a command received acknowledgement signal in response to a received interface command from said system controller requesting data from an associated port circuit and wherein each port interface sends said data as an interface response to a subsequent read command from said system controller and
    said system controller including
    first means for transmitting a separate interface command to each of a preselected number of said port interfaces in a predetermined order and for receiving a separate command received acknowledgement signal from each of said preselected number of said port interfaces and
    second means operational after said first transmitting means for transmitting a separate read command to each of said preselected number of said port interfaces in said predetermined order and for receiving a separate interface response from each of said preselected number of said port interfaces.

2. The communication system of claim 1 further including
    a plurality of port processors each interposed between an associated one of said port interfaces and a group of port circuits and responsive to a port command from said associated port interface for collecting data from said group of ports cicuits and transmitting said collected port data to said associated port interface and wherein said associated port interface generates said port command in response to a separte interface command and wherein said associated port interface generates said interface response including said collected port data.

3. The communication system of claim 1 wherein said system controller further includes means associated with said first transmitting means for storing the addresses of each of said preselected number of said port interfaces to establish said predetermined order to transmitting said interface commands.

4. The communication system of claim 1 wherein said system controller further includes means associated with said first transmitting means for selecting each of said preselected number of said port interfaces by specifying a first port interface and a last port interface of said preselected number of said port interfaces.

5. The communication system of claim 1 wherein said system controller further includes means for indicating whether a specific port interface is equipped in said system and wherein said system controller communicates only with said equipped port interfaces.

6. The communication system of claim 1 wherein said system controller further includes means for storing comparison data, means for comparing each port interface response against said comparison data and means for summarizing the results of said comparing means from said preselected number of said port interfaces.

7. The communication system of claim 6 wherein said system controller further includes means for storing multiple port interface commands, wherein said comparison data storing means includes comparison data associated with each interface command, and said comparing means compares each port interface response against the comparison data associated with the interface command sent to each port interface.

8. The communication system of claim 1 wherein said system controller further includes means for establishing a time limit, means for signaling when said time limit has expired before the completion of the operations of said first transmitting and receiving means and said second transmitting and receiving means.

9. A port communication apparatus for use with a communication system for controlling communications between a system controller and a number of port interface circuits each of which interfaces a communication device to said system, said port communication apparatus including first means for transmitting a separate interface command to each of a preselected number of said port interfaces in a predetermined order requesting data from an associated communication device and for receiving command received acknowledgement signals from each of said port interfaces and second means operational after said first transmitting means for transmitting a read command to each of said preselected number of said port interfaces in said predetermined order and for receiving an interface response including said requested data from each of said preselected number of said port interfaces.

10. The port communication apparatus of claim 9 further including means associated with said first means for storing the addresses of each of said preselected number of said port interfaces to establish said preselected order for transmitting said interface commands.

11. The port communication apparatus of claim 9 further including means associated with said first transmitting means for selecting said number of said port interfaces by specifying a first port interface and a last port interface of said preselected number of said port interfaces.

12. The port communication apparatus of claim 9 further including means for indicating whether a specific port interface is equipped in said system and wherein said port communication apparatus communicates only with said equipped port interfaces.

13. The port communication apparatus of claim 9 further including means for storing comparison data, means for comparing each port interface response against said comparison data and means for summarizing the results of said comparing means for said preselected number of said port interfaces.

14. The port communication apparatus of claim 13 further including means for storing multiple port interface commands, wherein said comparison data storing means includes comparison data associated with each interface command, and said comparing means compares each port interface response against the comparison data associated with the interface command sent to each port interface.

15. The port communication apparatus of claim 9 further including means for establishing a time limit, means for signaling when said time limit has expired before the completion of the operations of said first transmitting and receiving means and said second transmitting and receiving means.

16. A method of operating a communication system for serving a plurality of communication devices each of which is connected to an associated port circuit, said system including a system controller for transmitting commands to a plurality of port interfaces each interposed between said system controller and one of said port circuits and for receiving data transmitted from said port interfaces, said method comprising the steps of:

transmitting from said system controller an interface command for requesting data from each of a preselected number of said port interfaces in a predetermined order, sending an acknowledgement signal from each of said preselected number of said port interfaces in response to a received interface command from said system controller, transmitting from said system controller in response to receiving said acknowledgement signals from each of said preselected number of said port interfaces a read command to each of said preselected number of said port interfaces in said predetermined order, sending data from each of said preselected number of said port interfaces in response to a receive read command from said system controller and receiving at said controller said interface responses from each of said preselected number of said port interfaces.

17. The method of claim 16 wherein said system controller interface and read command transmitting steps include the step of:

getting prestored addresses of said port interfaces from a table to establish said predetermined order for command transmission.

18. The method of claim 16 wherein said system controller interface and read command transmitting steps include the step of:

selected said preselected number of said port interfaces for receiving command transmissions by specifying a first port interface and a last port interface of said preselected number of said port interfaces.

19. The method of claim 16 wherein said system controller interface and read command transmitting steps include the step of:

indicating from a table whether a specific port interface is equipped in said system and transmitting interface and read commands only to such equipped port interfaces.

20. The method of claim 16 further including the step of:

comparing each interface response against stored comparison data and summarizing the results of said comparing step for said preselected number of said interfaces.

21. The method of claim 16 futher including the step of:

signaling when a pre-established time limit has expired before the completion of the steps of claim 14.

22. A method of operating a port communication apparatus for use with a communication system for controlling communications between a system controller and port interface circuits which interface communication devices to said system, the method comprising the steps of:

transmitting separate interface commands to each of a preselected number of said port interfaces in a predetermined order requesting data from an associated communication device, receiving separate command received acknowledgement signals from each of said preselected number of said port interfaces, transmitting separate read commands to each of said preselected number of said port interfaces in said predetermined order and receiving separate interface responses from each of said preselected number of said port interfaces, said responses including said requested data by said separate interface commands.

* * * * *